United States Patent
Van Horn

(10) Patent No.: US 8,839,383 B2
(45) Date of Patent: Sep. 16, 2014

(54) AUTHENTIFICATION BROKER FOR THE SECURITIES INDUSTRY

(75) Inventor: Richard Van Horn, Montlair, NJ (US)

(73) Assignee: Goldman, Sachs & Co., New York, NY (US)

( * ) Notice: Subject to any disclaimer, the term of this patent is extended or adjusted under 35 U.S.C. 154(b) by 1477 days.

(21) Appl. No.: 11/841,500

(22) Filed: Aug. 20, 2007

(65) Prior Publication Data

US 2009/0055907 A1    Feb. 26, 2009

(51) Int. Cl.
*H04L 29/06* (2006.01)
*H04L 9/32* (2006.01)

(52) U.S. Cl.
CPC ......................................... *H04L 9/32* (2013.01)
USPC ................................................ 726/6; 726/18

(58) Field of Classification Search
CPC .......................................................... H04L 9/32
USPC .......................... 726/6, 18; 713/156–158, 184
See application file for complete search history.

(56) References Cited

U.S. PATENT DOCUMENTS

| | | | |
|---|---|---|---|
| 5,781,438 A * | 7/1998 | Lee et al. .................... | 705/404 |
| 5,987,140 A * | 11/1999 | Rowney et al. ............... | 705/79 |
| 5,987,441 A * | 11/1999 | Lee et al. .................... | 705/401 |
| 6,178,409 B1 * | 1/2001 | Weber et al. ................... | 705/79 |
| 6,260,028 B1 * | 7/2001 | Lee et al. .................... | 705/401 |
| 6,546,377 B1 * | 4/2003 | Gravell et al. ................. | 705/60 |
| 6,807,569 B1 * | 10/2004 | Bhimani et al. ............. | 709/217 |
| 6,922,678 B2 * | 7/2005 | Gravell et al. ............... | 705/401 |
| 7,013,290 B2 * | 3/2006 | Ananian ..................... | 705/26.42 |
| 7,171,217 B2 * | 1/2007 | Beuck ........................ | 455/456.1 |
| 7,234,059 B1 * | 6/2007 | Beaver et al. ................. | 713/170 |
| 7,350,229 B1 * | 3/2008 | Lander ............................. | 726/8 |
| 7,389,269 B1 * | 6/2008 | Robinson et al. ............... | 705/50 |
| 7,398,237 B2 * | 7/2008 | Agostini et al. ............... | 705/35 |
| 7,472,277 B2 * | 12/2008 | Halcrow et al. ............. | 713/175 |
| 7,597,250 B2 * | 10/2009 | Finn ............................ | 235/380 |
| 7,647,277 B1 * | 1/2010 | Blumenfeld et al. .......... | 705/54 |
| 7,911,346 B1 * | 3/2011 | Claudatos et al. ......... | 340/572.4 |
| 7,996,891 B2 * | 8/2011 | Cardone et al. ............. | 726/10 |
| 8,055,535 B2 * | 11/2011 | Lavoie et al. ............... | 705/14.1 |
| 2002/0010684 A1 * | 1/2002 | Moskowitz ..................... | 705/75 |
| 2003/0004894 A1 * | 1/2003 | Rowney et al. ................ | 705/64 |
| 2003/0028451 A1 * | 2/2003 | Ananian ........................ | 705/27 |
| 2003/0033535 A1 * | 2/2003 | Fisher et al. ................. | 713/185 |
| 2003/0120606 A1 * | 6/2003 | Gravell et al. .................. | 705/60 |
| 2003/0191846 A1 * | 10/2003 | Hunnicutt et al. ............ | 709/229 |
| 2003/0200202 A1 * | 10/2003 | Hsiao et al. ..................... | 707/3 |
| 2004/0024688 A1 * | 2/2004 | Bi et al. ......................... | 705/37 |
| 2004/0066764 A1 * | 4/2004 | Koodli et al. ................. | 370/331 |
| 2004/0143521 A1 * | 7/2004 | Barnard et al. ................ | 705/30 |
| 2005/0033703 A1 * | 2/2005 | Holdsworth ................... | 705/67 |
| 2005/0086068 A1 * | 4/2005 | Quigley et al. .................. | 705/1 |
| 2005/0097060 A1 * | 5/2005 | Lee et al. ....................... | 705/65 |

(Continued)

*Primary Examiner* — David Garcia Cervetti
(74) *Attorney, Agent, or Firm* — Perkins Coie LLP

(57) ABSTRACT

Identity-independent authentication tokens enable issuance of a single strong credential that can be mapped to an individual at each of multiple accounts within the online world. An issuer generates one or more authentication tokens for issuance to individuals or other entities. In some instances, each of these authentication tokens comprises a unique serial number. The individual or other entity may then request an authentication token from the issuer. The issuer may then issue the token to the individual without the need to ask or require the individual to identify his or herself. The individual may then map this issued authentication token to the individual's password at each of the individual's online accounts.

25 Claims, 4 Drawing Sheets

(56) References Cited

U.S. PATENT DOCUMENTS

| | | |
|---|---|---|
| 2005/0154913 A1* | 7/2005 | Barriga et al. ............... 713/201 |
| 2005/0283608 A1* | 12/2005 | Halcrow et al. ............... 713/175 |
| 2006/0031481 A1* | 2/2006 | Patrick et al. ................ 709/224 |
| 2006/0031930 A1* | 2/2006 | Patrick et al. ................ 726/14 |
| 2006/0036553 A1* | 2/2006 | Gupta et al. .................. 705/52 |
| 2006/0036857 A1* | 2/2006 | Hwang ......................... 713/168 |
| 2006/0123472 A1* | 6/2006 | Schmidt et al. ................ 726/8 |
| 2006/0230271 A1* | 10/2006 | Milton et al. ................. 713/175 |
| 2006/0235803 A1* | 10/2006 | Romney ........................ 705/65 |
| 2007/0050635 A1* | 3/2007 | Popp ............................. 713/185 |
| 2007/0094721 A1* | 4/2007 | Nguyen et al. ................ 726/9 |
| 2007/0143831 A1* | 6/2007 | Pearson et al. ................ 726/5 |
| 2007/0156611 A1* | 7/2007 | Gupta et al. .................. 705/78 |
| 2007/0226150 A1* | 9/2007 | Pietrzak et al. ............... 705/59 |
| 2007/0255951 A1* | 11/2007 | Grynberg ...................... 713/168 |
| 2007/0289002 A1* | 12/2007 | van der Horst et al. ......... 726/9 |
| 2008/0010673 A1* | 1/2008 | Makino et al. ................ 726/6 |
| 2008/0028206 A1* | 1/2008 | Sicard et al. ................. 713/156 |
| 2008/0086759 A1* | 4/2008 | Colson ......................... 726/2 |
| 2009/0007249 A1* | 1/2009 | Lu et al. ....................... 726/9 |

* cited by examiner

AUTHENTIFICATION BROKER FOR THE SECURITIES INDUSTRY

BACKGROUND

In the physical world, strong credentials exist in the form of state-issued driver's licenses, social security cards, passports, and the like. These strong credentials often bind an individual to the credential with use of a name and a picture. The individual's name listed on this credential identifies the individual, while the individual's picture authenticates this identification.

Because a state agency issues these physical-world credentials, private businesses and the like are able to trust the representations made by these credentials. For instance, when an individual wishes to purchase a lottery ticket from a vendor, the vendor may inspect the individual's driver's license to ensure that the individual is of a proper age (e.g., eighteen). In addition to its strength, a credential such as a driver's license is nearly universally accepted as a proper means of identification.

In the online world, however, attempts to provide a single strong credential have been largely unsuccessful for a variety of reasons. First, online credentials are not issued by state agencies. Instead, private businesses have attempted to stand behind individuals' credentials. Unfortunately, other private businesses often cannot trust these private-business assertions due to industry "know-your-client" regulations. In addition, many of these supposed verified credentials do not accurately identify the credential's holder. This is because the credential-issuing private businesses do very little to ensure that an individual's name is that claimed by the individual. Typically, these companies merely require that the individual activate the issued credential by logging into the individual's given email account. Such an action far from guarantees the individual's identity. Because an individual's identity generally can not be authenticated with use of these existing techniques, these credentials offer very little value.

Due to these and other problems, use of a single credential within the online world has largely failed. Instead, most individuals utilize varying usernames and passwords to sign on to each of an individual's multiple accounts in the online world. Unfortunately, these multiple passwords can be difficult to remember in addition to being insecure.

SUMMARY

Identity-independent authentication tokens enable a single strong credential that can be mapped to an individual at each of the individual's multiple accounts within the online world. An issuer generates one or more authentication tokens for issuance to individuals or other entities. In some instances, each of these authentication tokens comprises a unique serial number. The individual or other entity then requests an authentication token from the issuer. The issuer, in response, issues the token to the individual without the need to ask or require the individual to identify his or herself. The individual may then choose to map this issued authentication token to the individual's password at each of the individual's online accounts.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure directs to identity-independent authentication tokens that may be issued to individuals or other entities for use with each of the individuals' multiple online accounts. These authentication tokens couple with service providers' "know-your-client" regulations to create a strong credential in an efficient and non-duplicitous manner. That is, the issuance of the authentication token to an individual need not rely or correlate with the individual's identity, as each service provider will likely separately verify the individual's identity during creation of the individual's online account. Once the individual's identity is verified and the account is created, the authentication token may then be mapped to the account to for future authentication of the individual. By divorcing identity from the authentication-token issuance process, this process becomes relatively low-cost and easier to implement.

For purposes of discussion, identity-independent authentication tokens are described with reference to an exemplary environment. However, it should be appreciated that the described techniques may be implemented in other environments.

Exemplary Environment

Figure 1:
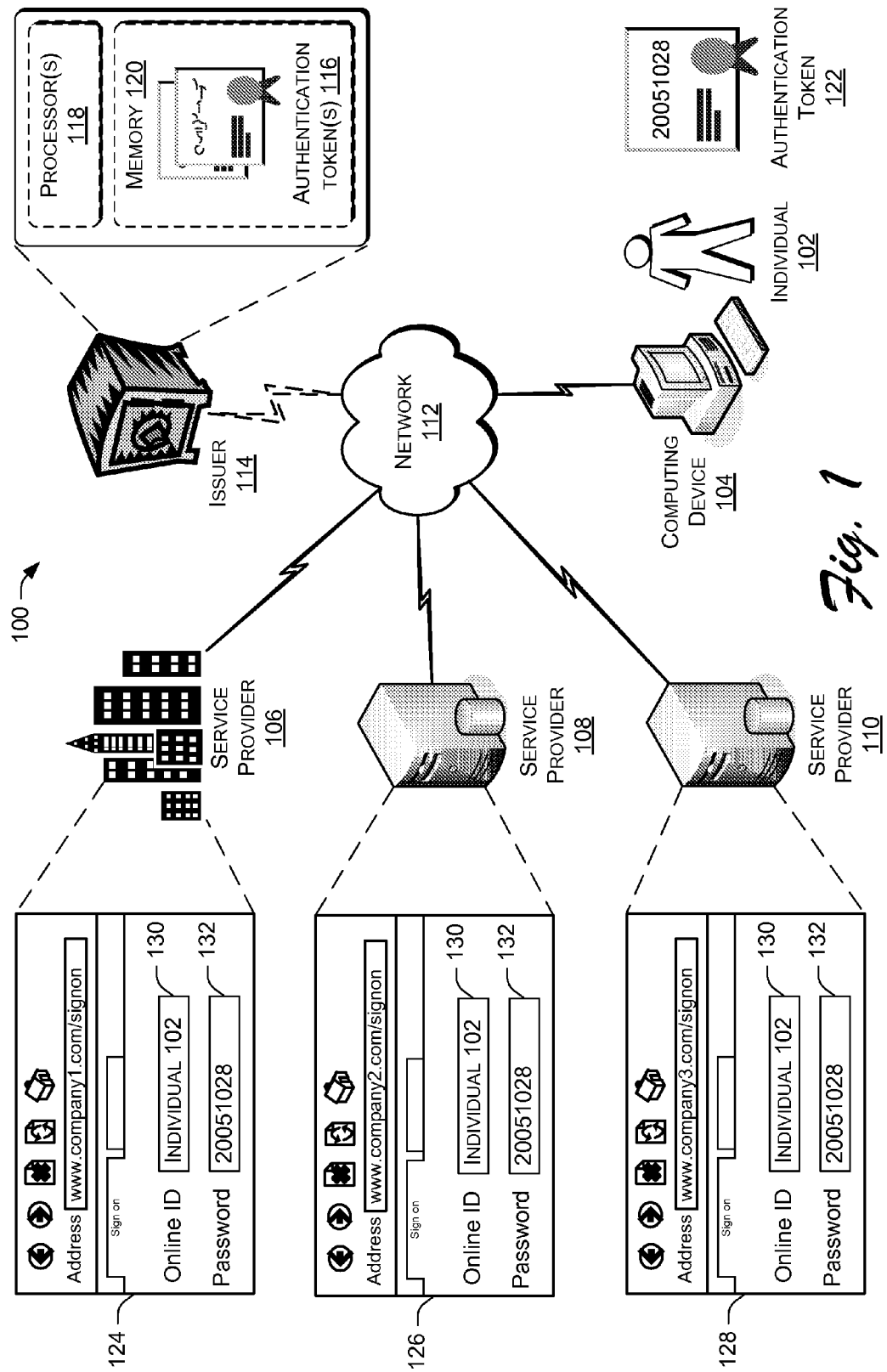
FIG. 1 illustrates an exemplary architecture for implementing identity-independent authentication tokens. The network environment includes an individual's computing device coupled via a network to an authentication token issuer and multiple service providers.

FIG. 1 illustrates an exemplary environment 100 in which identity-independent authentication tokens may be issued and employed. Environment 100 includes an individual 102 operating a computing device 104, which connects to service providers 106, 108, and 110 via a network 112. While individual 102 is illustrated, other environments may include a group of individuals or any other entity. Service providers 106-110, meanwhile, may include any entity, business, or provider with which individual 102 may maintain an online account. For instance, these service providers may be include financial institutions, news organizations, investment management organizations, email providers, and the like.

FIG. 1 also illustrates an issuer 114, which issues one or more authentication tokens 116 to entities such as individual 102. Issuer 114 may also manage each issued authentication token. Each of authentication tokens 116 is unique as to the other tokens and, as such, each token may include a unique identifier. This unique identifier includes a serial number, a collection of symbols, a bar code, and/or any other identifier capable of uniquely identifying a corresponding token. In the illustrated implementation, each of authentication tokens 116 include unique serial numbers.

Issuer 114 issues authentication tokens 116 in either physical or electronic form. When issued in physical form, authentication tokens 116 comprise a certificate, card, badge, or any other tangible medium. In some implementations where issuer 114 issues authentication tokens 116 in physical form, issuer 114 itself operates as a vendor within a physical store. That is, issuer 114 may operate at a store at which individual 102 may acquire one or more of authentication tokens 116. In other implementations, individual 102 orders (e.g., online) a physical authentication token from issuer 114, which ships this token to the individual.

In other instances, issuer 114 issues authentication tokens in electronic form. In these instances, issuer 114 issues one or more tokens to individual 102 via network 112. Individual 102 therefore navigates computing device 104 to a Web page operated by issuer 114 to acquire one of authentication tokens 116. In these instances, issuer 114 may include one or more processors 118 as well as memory 120, in which authentication tokens 116 are stored.

Memory 120 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

When issued in electronic form, authentication tokens 116 may comprise digital certificates or the like, which store on an individual's computing device such as computing device 104. These authentication tokens 116 may conversely comprise security assertion markup language (SAML). While two specific examples have been given of electronic tokens have been provided, it is specifically noted that authentication tokens 116 may be of any other electronic format capable of uniquely identifying a corresponding token.

With use of environment 100, individual 102 receives an authentication token 122 from issuer 114. As discussed above, individual 102 either receives token 122 in physical form or electronic form. In the latter instance, individual navigates to issuer 114 with use of computing device 104. As shown, authentication token 122 includes a unique serial number "20051028". Issuer 114 may also manage authentication token 122. If, for instance, individual 102 somehow loses authentication token 122 or if this token somehow becomes insecure, individual 102 may report to issuer 114 that authentication token 122 is no longer valid. Responsive to such a report, issuer 114 will in turn report this invalidity to service providers 106-110, either proactively or in response to a service provider inquiry, as discussed below.

In some instances, issuer 114 does not require individual 102 to identify his or herself when acquiring this token. That is, issuer 114 may not associate an issued token with an individual's legal name. Instead, individual 102 may merely request and receive a token. When individual 102 creates an account with each of service providers 106-110, each corresponding service provider will likely require individual 102 to identify his or herself with use of a strong credential such as a driver's license, passport, or the like. As such, issuer 114 does not need individual 102 to additionally identify his or herself.

Issuing authentication tokens 116 without requiring identification decreases the administrative overhead and, hence, the cost of issuing these tokens. In addition, issuer 114 does not assume any liability associated with attempting to identify individual 102. For instance, if authentication token 122 were to falsely identify individual 102, and if one of service providers 106-110 relies on this false identification, then issuer 114 may potentially be liable to the service provider for any resulting damages. Divorcing identification from authentication tokens 116, however, obviates the grounds for this liability and correspondingly decreases the cost of issuing the tokens.

Although issuer 114 may not require individual 102 to identify his or herself in order to acquire authentication token 122, issuer 114 may somehow link or map this token to individual 102. This mapping enables individual 102 to return to issuer 114 and again receive authentication token 122 if individual 102 somehow loses this token. Issuer 114 may map authentication token 122 to individual 102 in multiple ways. For instance, issuer 114 could merely ask for the individual's name.

The issuer may additionally or alternatively ask individual 102 a series of questions. These questions may include the individual's birth date, mother's maiden name, pet name(s), place of birth, and/or the like. Upon the individual's return to a web page of issuer 114, issuer 114 poses these questions to individual 102 and, if the answers match those previously given, reissues authentication token 122. Issuer 114 thus ensures that individual 102 is the same individual to which authentication token 122 (having serial number 20051028) was originally issued.

After individual 102 receives authentication token 122, individual 102 may navigate to one of Web pages 124, 126, and/or 128, each corresponding to a respective one of service providers 106-110. Individual 102 may then either create a new account with the corresponding service provider, or may instead map authentication token 122 to an already-existing account of the individual.

For instance, imagine that individual 102 navigates to Web page 124 to create an account with service provider 106. Service provider 106 may go through a "know-your-client" process, at which point service provider may require individual 102 to accurately identity his or herself. This identification process generally includes requiring individual 102 to demonstrate to service provider 106 a state-issued credential or the like.

Once an account has been created, service provider 106 enables individual 102 to create an online identification 130 and a password 132 for the individual's use in accessing an online account. As illustrated, online identification 130 may merely comprise the user's name, or may comprise some other identifier. The unique serial number of authentication token 122, meanwhile, may be used as password 132. As such, authentication token 122 may now be used to enable individual 102 to access the online account with service provider 106. Authentication token 122 enables such access despite the fact that authentication token does not itself contain an identification of individual 102.

In addition, imagine that individual 102 has existing online accounts with each of service providers 108 and 110. As such, both of these service providers have previously identified individual 102. These service providers have also previously created an online identification and password to individual 102 to enable the individual to access the online accounts. Individual 102 then navigates to each of Web pages 126 and 128 in order to map password 132 for each of the online accounts to authentication token 122. That is, individual 102 substitutes an existing password for these online accounts for the unique serial number (20051028) of authentication token 122.

Having now mapped the unique serial number of authentication token 122 to each of the individual's three illustrated online accounts, the individual now has a single credential for each account. In addition, because issuer 114 issues a unique authentication token to a single individual or entity in a secure fashion, this single credential is also very secure.

Environment 100 also allows service providers 106-110 to conduct a back check on the validity of authentication token 122 when individual signs into a corresponding account with the token. For instance, imagine that individual 102 navigates to Web page 124 and begins to sign into the individual's online account with use of authentication token 122. Service provider 106 may then communicate with issuer 114 via network 112 to inquire about the validity of authentication token 122. If, for instance, individual 102 has informed issuer 114 that individual 102 has misplaced authentication token 122, then issuer 114 may notify service provider 106 that the token is invalid. Service provider 106 may accordingly deny authentication of individual 102 (or the individual masquerading as individual 102) and, hence, may deny individual 102 (or other individual) access to the online account until the discrepancy is reconciled. If, however, issuer 114 informs service provider 106 that authentication token 122 is still valid, then service provider 106 may authenticate individual 102. Service provider 106 may therefore allow the individual to access the online account with use of the token.

This back check may also be utilized to charge service provider 106, individual 102, and/or issuer 114 for use of authentication token 122. While traditional credential-issuing services charge for a credential at a time that a credential issues, environment 100 may also allow for a per-transaction cost. That is, when individual signs into an online account (e.g., with service providers 106-110), the corresponding service provider may inform issuer 114 of the individual's use of authentication token 122. Issuer 114, or some related entity, may then charge (i.e. request payment from) a corresponding service provider for use of this token.

In addition, some or all of authentication tokens 116 may be sponsored by one or more sponsors. These sponsors may be businesses, banks, individuals, or any other entity. When an authentication token includes a sponsor, the sponsor may receive payment at issuance of the token or during use of the token. For instance, a sponsor of authentication token 122 could receive a payment when individual 102 signs onto the individual's online account with service providers 106-110. Individual 102, service providers 106-110, and/or issuer 114 may make some or all of these payments to the sponsor. Conversely, issuer 114 may also charge the sponsor at the token's issuance or during the token's use.

Operation

Figure 2:
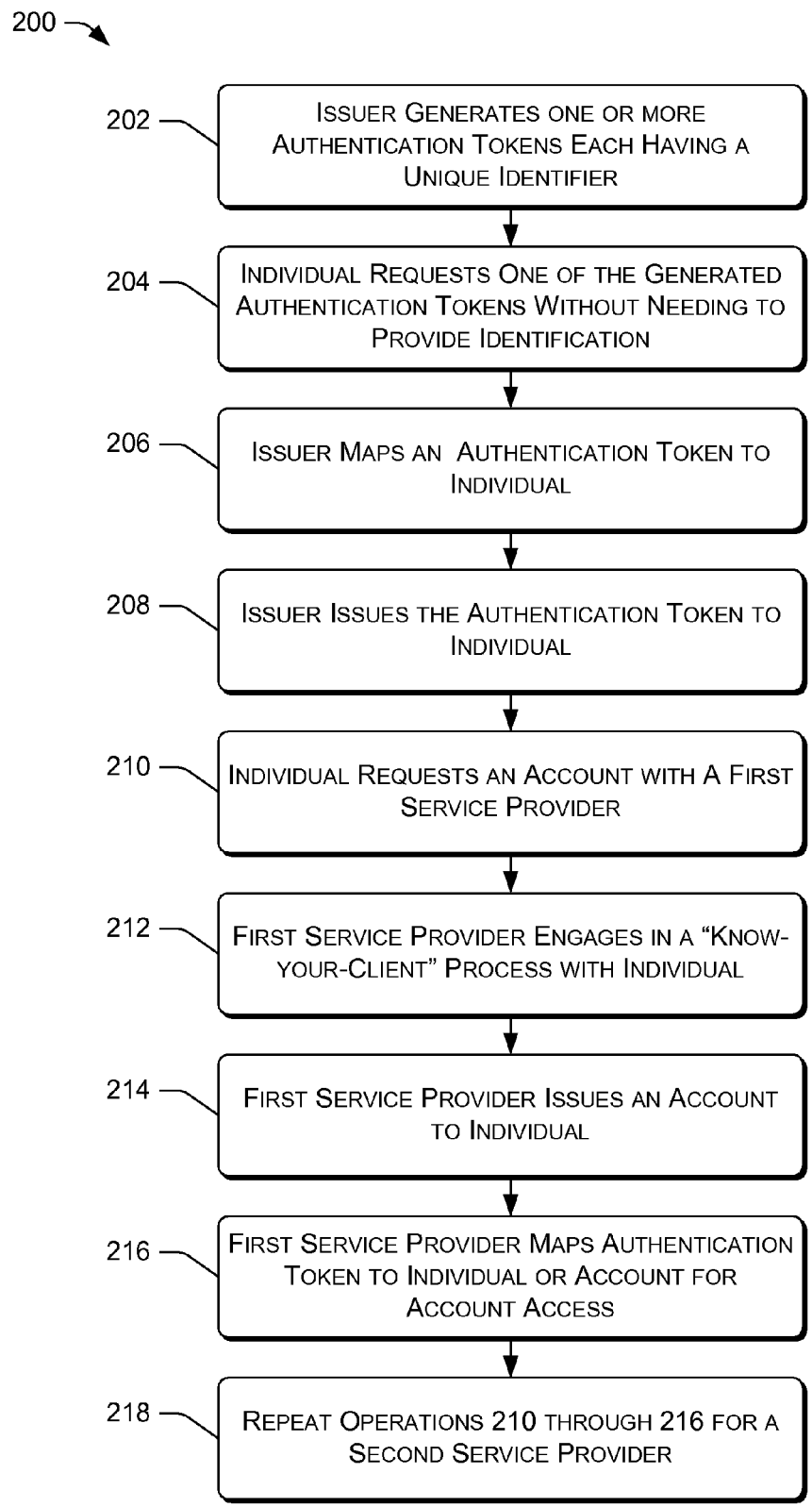
FIG. 2 is a flow diagram of an exemplary process for issuing and employing an identity-independent authentication token that can be mapped to each of an individual's online accounts.
Figure 3:
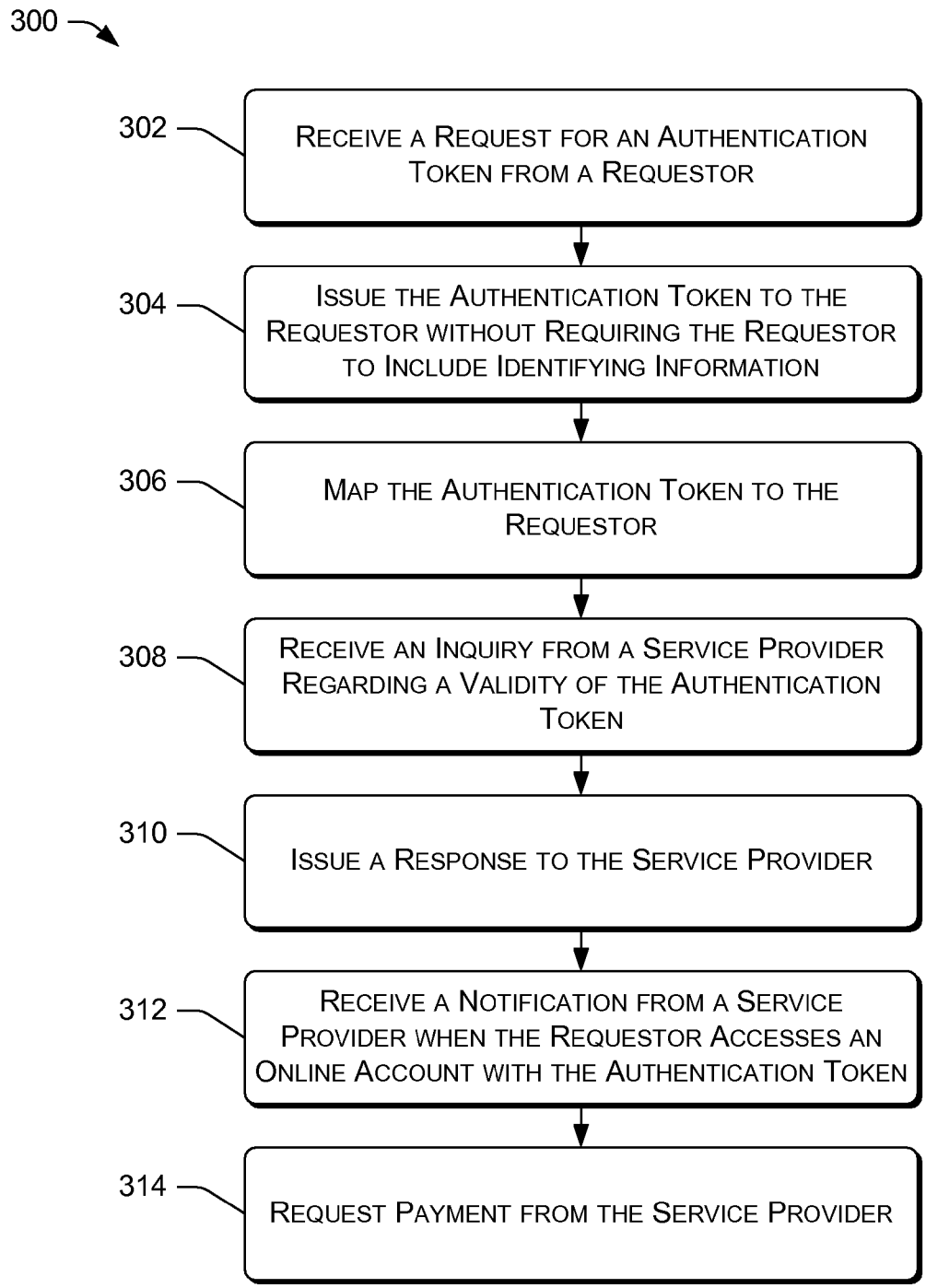
FIG. 3 is a flow diagram of another exemplary process for issuing and employing an identity-independent authentication token.
Figure 4:
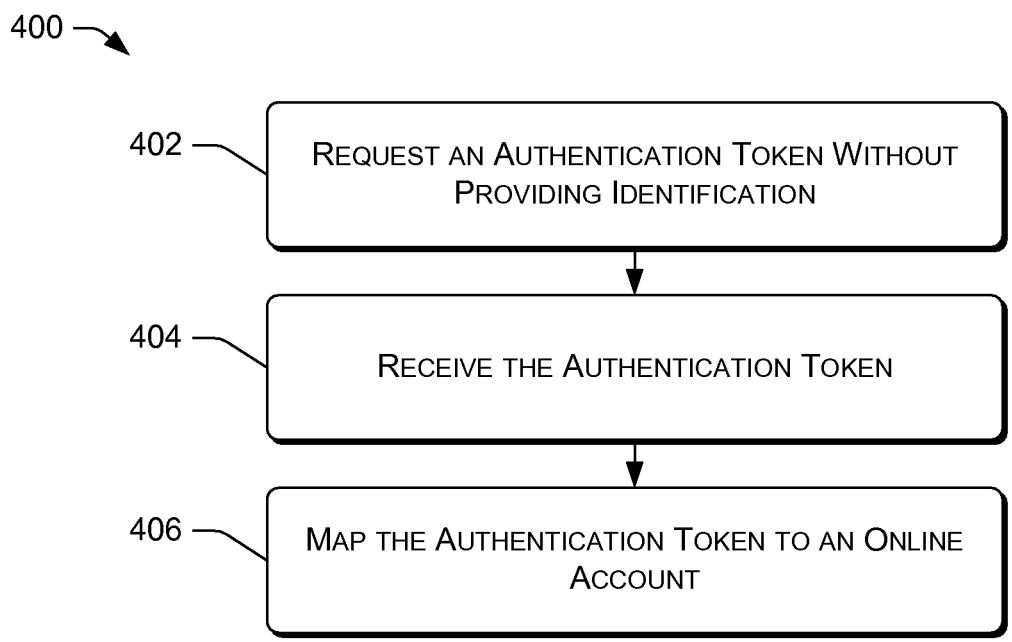
FIG. 4 is a flow diagram of an exemplary process for requesting, receiving, and employing an identity-independent authentication token.

FIGS. 2-4 illustrate exemplary processes 200, 300, and 400 for employing an identity-independent authentication token that may be mapped to each of an individual's online accounts. These processes are illustrated as collections of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 200 includes operation 202, which represents an issuer generating one or more authentication tokens, each of the tokens having a unique identifier. As discussed above, this unique identifier may comprise a unique serial number corresponding to each token. Operation 204 represents an individual or other entity requesting one of the generated authentication tokens without the need to provide the individual's identification. For instance, an individual may request a token without having to provide the issuer with the individual's legal name, as discussed above. At operation 206, the issuer maps an authentication token to the individual. While this may include mapping a token to the individual's name, it need not. For instance, this operation may instead include asking the individual a series of questions, the answers to which may be used to map an authentication token to the individual Operation 208, meanwhile, represents issuance of the mapped authentication token to the individual. At operation 210, the individual requests an account with a first service provider. These service providers may comprise any of the exemplary service providers discussed above. At operation 212, the first service provider engages in a "know-your-client" process with the individual. This process may be required by regulations or laws in some industries. Operation 214 then represents that the first service provider issues an account to the individual. Operation 216 then represents that the first service provider maps the individual's authentication token to the individual or the account to enable access to the individual's online account.

Finally, operation 218 represents that operations 210 through 216 may repeat for a second service provider. In addition, while process 200 describes the use of an authentication token for use with a newly-created online account, portions of this process may be similarly used to map the individual's authentication token to existing online accounts.

FIG. 3, meanwhile, illustrates exemplary process 300 for employing identity-independent authentication tokens. Process 300 includes operation 302, which represents receiving a request for an authentication token from a requester. Operation 304 then represents issuing the authentication token to the requestor without requiring the requestor to include identifying information. At operation 306, the authentication token may be mapped to the requester. Mapping the token to the requestor may include gathering information about the requestor (e.g., through asking the requestor a series of questions). This information enables re-issuance of the same authentication token to the same requestor if necessary.

Operation 308 then represents receiving an inquiry from a service provider regarding a validity of the authentication token. This inquiry may be in response to the requestor requesting to log in to an online account of the requester. Operation 310 then represents issuing a response to the service provider in response to the received inquiry. If the response indicates that the authentication is no longer valid, then the service provider could choose to deny the requestor's request to log in to the online account. If the response indicates that the authentication token is valid, however, then the service provider will likely choose to allow the requestor to log in to the account.

Operation 312 represents receiving a notification from a service provider when the requestor accesses an online account with use of the authentication token. This notification may be used to charge back a cost of using the authentication token. As such, operation 314 represents requesting payment from the service provider. In other implementations, payment may be requested from other entities, such as the requester.

FIG. 4 illustrates exemplary process 400. This process includes operation 402, which represents requesting an authentication token without providing identification. Operation 404, meanwhile, represents receiving the authentication token in response to the request. Finally, operation 406 represents mapping the authentication token to an online account. With this mapping, the online account may be accessed with use of the authentication token.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A processor-implemented method comprising:
   generating, via a processor, an authentication token comprising a unique identifier configured for input as a password by an individual to an online account;
   issuing, via the processor, the authentication token to the individual without requiring identification of the individual;
   receiving a validation request from a service provider of the online account where the individual has mapped the authentication token to the online account allowing the authentication token to be used to access the online account, wherein the validation request includes the unique identifier supplied by the individual as the password; and
   determining if the authentication token associated with the unique identifier is valid.

2. The processor-implemented method as recited in claim 1, wherein the authentication token is one of multiple authentication tokens and at least some of the multiple authentication tokens are embodied as digital certificates.

3. The processor-implemented method as recited in claim 1, wherein the unique identifier comprises a serial number.

4. The processor-implemented method as recited in claim 1, further comprising mapping the authentication token to the individual.

5. The processor-implemented method as recited in claim 1, further comprising mapping the authentication token to the individual, and wherein the mapping comprises:
   asking one or more questions to the individual; and
   storing answers to the one or more questions.

6. The processor-implemented method as recited in claim 1, further comprising receiving a request from the individual for the authentication token.

7. The processor-implemented method as recited in claim 1, further comprising:
   requesting an account with a service provider; and
   mapping the account to the authentication token.

8. The processor-implemented method as recited in claim 1, wherein the service provider is a first service provider and the online account is a first online account, the method further comprising:
   requesting the first online account with the first service provider;
   mapping the first online account with the first service provider to the authentication token;
   requesting a second online account with a second service provider; and
   mapping the second online account with the second service provider to the authentication token.

9. The processor-implemented method as recited in claim 1, further comprising:
   requesting the online account with a service provider;
   documenting the identity of the individual; and
   mapping the online account to the authentication token.

10. The processor-implemented method as recited in claim 1, further comprising substituting a password with the authentication token for the online account with the service provider.

11. The processor-implemented method as recited in claim 1, wherein the online account is a first online account and the service provider is a first service provider, the method further comprising:
   substituting a first password with the authentication tokens for the first online account with the first service provider; and
   substituting a second password with the authentication token for a second online account with a second service provider.

12. A non-transitory computer-readable medium storing computer-executable instructions that, when executed on one or more processors, performs acts comprising:
   receiving, from a requestor, a request for an authentication token configured for input as a password by the requestor; and
   issuing the authentication token to the requestor without requiring identifying information of the requestor in the request;
   receiving a validation request from a service provider where the requestor has mapped the authentication token to the service provider allowing the authentication token to be used for access, wherein the validation request includes the authentication token received as a password;
   notifying the service provider of a status of the authentication token.

13. The non-transitory computer-readable medium as recited in claim 12, wherein the authentication token includes an identifier that is unique to the authentication token.

14. The non-transitory computer-readable medium as recited in claim 12, further comprising mapping the authentication token to the requestor such that the authentication token may be issued to the requestor a second time.

15. The non-transitory computer-readable medium as recited in claim 12, further comprising requesting payment from the service provider for the notification of the status of the authentication token.

16. The non-transitory computer-readable medium as recited in claim 12, further requesting payment from the requestor for each use of the authentication token.

17. The non-transitory computer-readable medium as recited in claim 12, further comprising receiving a notification from a service provider when the requestor accesses an online account with use of the authentication token.

18. The non-transitory computer-readable medium as recited in claim 12, further comprising:
   receiving a notification from a service provider when the requestor accesses an online account with use of the authentication token; and
   responsive to the receiving of the notification, requesting payment from the service provider.

19. A processor-implemented method comprising:
   requesting, via a processor, by an individual, an authentication token without providing an identification of the individual, the authentication token having a unique identifier configured for input as a password for use in accessing multiple online accounts accessible by the individual; and receiving, via the processor, a validation request from one of the multiple online accounts to validate the authentication token where the individual has mapped the authentication token to the multiple online accounts allowing the authentication token to be used in accessing the multiple online accounts, wherein the validation request includes the unique identifier supplied by the individual as the password.

20. The processor-implemented method as recited in claim 19, wherein the authentication token includes a unique serial number.

21. The processor-implemented method as recited in claim 19, wherein the multiple online accounts include at least one online account provided by an investment management organization.

22. The processor-implemented method as recited in claim 19, wherein the multiple online accounts include at least one online account provided by a financial institution.

23. The processor-implemented method as recited in claim 19, further comprising mapping the authentication token to at least one of the multiple online accounts such that the individual is allowed to access the at least one of the multiple online accounts with use of the authentication token.

24. The processor-implemented method as recited in claim 19, further comprising mapping the authentication token to the multiple online accounts such that the individual is allowed to access each of the multiple online accounts with use of the authentication token.

25. The processor-implemented method as recited in claim 19, further comprising:
creating an online account with a service provider; and
mapping the online account to the authentication token such that the individual is allowed to access the online account with use of the authentication token.

* * * * *